April 8, 1958  G. BROUSSAUD ET AL  2,830,267
ELECTROMAGNETIC WAVE DETECTOR DEVICE
Filed Dec. 28, 1954

INVENTORS
GEORGES BROUSSAUD
AND JEAN-CLAUDE SIMON
BY
ATTORNEY

United States Patent Office 2,830,267
Patented Apr. 8, 1958

2,830,267

ELECTROMAGNETIC WAVE DETECTOR DEVICE

Georges Broussaud and Jean-Claude Simon, Paris, France, assignors to Compagnie Generale de Telegraphie Sans Fil, a corporation of France Application December 28, 1954, Serial No. 478,045

Claims priority, application France January 29, 1954

2 Claims. (Cl. 324—95)

The present invention relates to ultra-high frequency electromagnetic wave detectors for detecting the presence of such waves and more particularly of centimeter and millimeter waves. Silicium or germanium crystals are generally used for the detection of the waves of this range. Such crystals have a unidirectional conductivity which provides the detecting effect.

As is known, such detectors are very sensitive to mechanical shocks, they are easily damaged by strong electrical pulses, and their capacity is an obstacle to use them for waves of the order of one centimeter or less.

It is an object of the present invention to provide a detector which is mechanically and electrically stronger and easier to manufacture than the above-mentioned crystal detectors, and which can be used for detecting substantially shorter waves than those which can be detected with crystal detectors.

The device according to the invention makes use of certain properties of magnetostrictive ferrites. Applicants have found that if such ferrites are subjected to a variable magnetizing field I, the resulting magnetic induction B is such that, if B is plotted against I, the curve obtained has a shape similar to that of the resistence vs. current curve of semi-conductive detectors.

The detecting device according to the invention includes a rod of magnetostrictive ferrite adapted for being subjected, over at least a portion of its length, to the action of the ultra-high frequency wave to be detected, which produces in the rod a continuous magnetic induction proportional to the amplitude of the wave, means being provided for modulating the ultra-high frequency wave at a frequency which is the mechanical resonance frequency of the rod, the latter being clamped at one of the nodes of its resonating vibration. Means are also provided, in the vicinity of this node, for detecting the vibrations of the rod and measuring their amplitude.

The invention will be better understood from the following description, with reference to the attached drawings in which.

It is known that ferrite bars or rods are notably magnetostrictive. As is well known, such bars are produced by moulding powdered substances of which the general formula is $MFe_2O_4$, where M is a bivalent metal. There is thus obtained a very hard material which may be milled or polished to the desired size.

If such a bar is placed in a uniform, constant magnetizing field of intensity I directed along its longitudinal axis, the magnetostriction process results in variations of the length of the bar. If the field has a variable intensity, whilst its direction remains constant, a variable magnetic induction B is produced in the bar.

Figure 1:
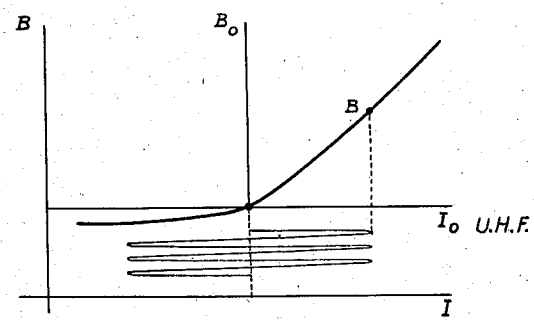
Fig. 1 shows the magnetizing characteristic of a magnetostrictive ferrite.

Fig. 1 illustrates the variations of B as a function of I.

It will be seen from this figure that B is not a linear function of I. For a certain value $I_0$, the curve displays an angular point. For $I > I_0$, the curve $B = f(I)$ may be considered as a straight line, the slope of which is of the order of unity; for $I < I_0$, the slope of the curve is negligible and may be assumed to be nil as will be done hereinafter.

If I is a function of time of the form $$I = I_0 + I_1 \cos \omega t \qquad (1)$$

it will be found, that for $I \leq I_0$, the induction, say $B_0$, in the rod is substantially constant; for $I > I_0$, this induction is greater than $B_0$. If the frequency of I is sufficiently high, it will be possible to measure a constant induction in the ferrite greater than $B_0$, equal to $B_0 + B_1$, and which will be an increasing function of $I_1$. This is entirely similar to what occurs in the course of the detection performed by semi-conductive bodies. This property is used in the device according to the invention, as shown in Figs. 2 and 3.

Figure 2:
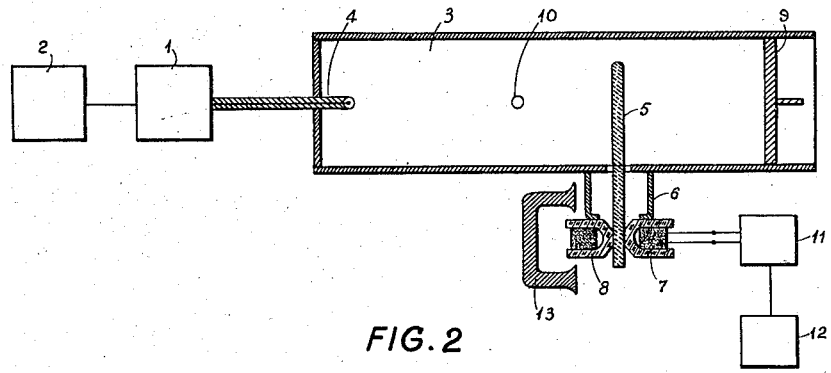
Fig. 2 shows diagrammatically an embodiment of the device according to the invention.
Figure 3:
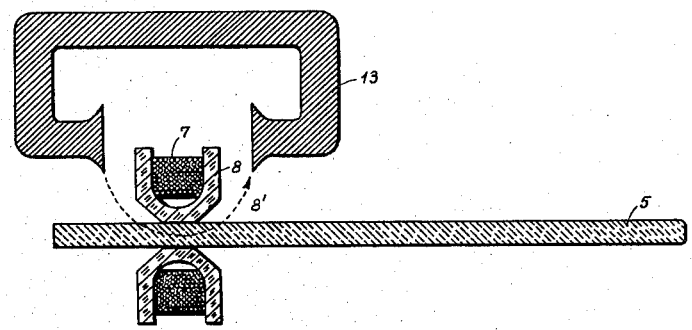
Fig. 3 shows a detail of Fig. 2, to an enlarged scale.

According to the embodiment shown in Fig. 2, the ultra-high frequency wave to be detected is produced by the oscillator 1, for example a klystron.

An auxiliary modulator 2 amplitude modulates the output of the oscillator 1 at a frequency Fm equal to a resonance frequency of the bar 5.

The oscillator 1 is coupled to a guide 3 of rectangular cross-section, by means of a suitable probe 4. A bar of magnetostrictive ferrite 5 penetrates into the guide 3. An induction coil 7 surrounds the bar 5. This coil is housed in a mounting 8 made of some non-magnetic and preferably insulating material, such as Plexiglas, having a narrow central section 8' into which the bar 5 is fastened. The mounting 8 is supported on brackets 6, welded to the guide 3. The coil 7 thus surrounds the bar 5 at the point wherein the latter is held clamped, both ends of the bar remaining free.

As already mentioned, the bar is held clamped at a point which is a nodal point of vibration, when the bar freely vibrates at a resonating frequency thereof, for instance a point distant a quarter of the length from one of the ends of the bar.

A matching device comprising for instance a piston 9 and a stub 10 (Fig. 2) make it possible to match the ferrite bar 5 to the guide 3, as well known in the art. The bar behaves like an energy transformer, absorbing substantially all of the incident wave energy. It is possible to tune such an assembly until the energy propagates in the guide substantially as a progressive wave.

The coil is connected to the measuring device 12 through an amplifier 11 tuned to the modulating frequency Fm.

The ferrite bar is magnetically biased by means of the constant longitudinal field $I_0$ of the Equation 1 produced by a permanent magnet 13. This provides the induction $B_0$ in the bar 5 (Fig. 1).

Now the bar has a relatively great electric resistivity. This leads to two consequences. In the first place, an ultra-high frequency field is sustained inside the bar and not only on its faces as would be the case if the bar has no resistivity. Furthermore, this field is sustained only over a portion of the length of the bar neighboring the end inside the guide, as a result of the high resistance of the ferrite at high frequencies.

If the incident wave were not modulated, the ultra-high frequency field would produce in the above-mention portion of the bar a continuous induction $B_0 + B_1$ which would be a function of the amplitude of the incident wave.

However, the incident wave is modulated at the resonance frequency $Fm$ of the bar. As a result, the induction in this portion of the bar will be $$B_0 + B_1 \cos \frac{2\pi}{Fm} t$$

Because of the magnetostriction of the ferrite, the bar 5 will mechanically resonate. Due to inverse magnetostriction, there will be induced in the coil 7 an A. C. current of the frequency $Fm$. The amplitude of the current will of course be proportional to $B_1$.

This current is amplified at 11 and measured at 12.

Such a system can be used as a wattmeter when operating at very high frequencies.

Tests have been conducted with a rectangular guide in which a 10 cm. wave was propagated.

A ferrite of type F rod was used. This rod was 4 mm. in diameter and 10 cm. in length, and was inserted in the guide through its smaller wall and was penetrating 4 cm. into the guide.

The wave was modulated at 72 kc./s. and there was collected across the terminals of a coil having 1500 turns an A. C. voltage of some 1/10 millivolt, of the same frequency, said voltage being proportional to the amplitude of the ultra-high frequency wave.

What we claim is:

1. A device for detecting the presence of ultra-high frequency energy propagating in a hollow wave guide comprising in combination: means for amplitude modulating said energy at a given frequency; a bar, made of a magnetostrictive ferrite, having a first and a second end, said ends remaining free, said first end protruding into said wave guide, the mechanical resonance of said bar being equal to said given frequency; means for clamping said bar at a given point which is a nodal point when the bar freely vibrates; means for transfering said utlra-high frequency energy from said line to said bar, and means for creating in said bar a constant magnetic field.

2. A device for detecting the presence of ultra-high frequency energy propagating in a hollow wave guide comprising in combination: means for amplitude modulating said energy at a given freqeuncy; a bar, made of a magnetostrictive ferrite, having a first and a second end, said ends remaining free, said first end protruding into said wave guide, the mechanical resonance of said bar being equal to said given frequency; means for clamping said bar at a given point which is a nodal point when the bar freely vibrates; means for transferring said ultra-high frequency energy from said line to said bar; an induction coil surrounding said bar, and having an output; an amplifier having an input connected to said coil output, and an output; a measuring device connected to said amplifier output; and means for creating in said bar a constant magnetizing field.

References Cited in the file of this patent

UNITED STATES PATENTS

| | | |
|---|---|---|
| 2,453,532 | Norton | Nov. 9, 1948 |
| 2,643,280 | Bernier | June 23, 1953 |
| 2,660,712 | Landon | Nov. 24, 1953 |